Patented Oct. 12, 1948

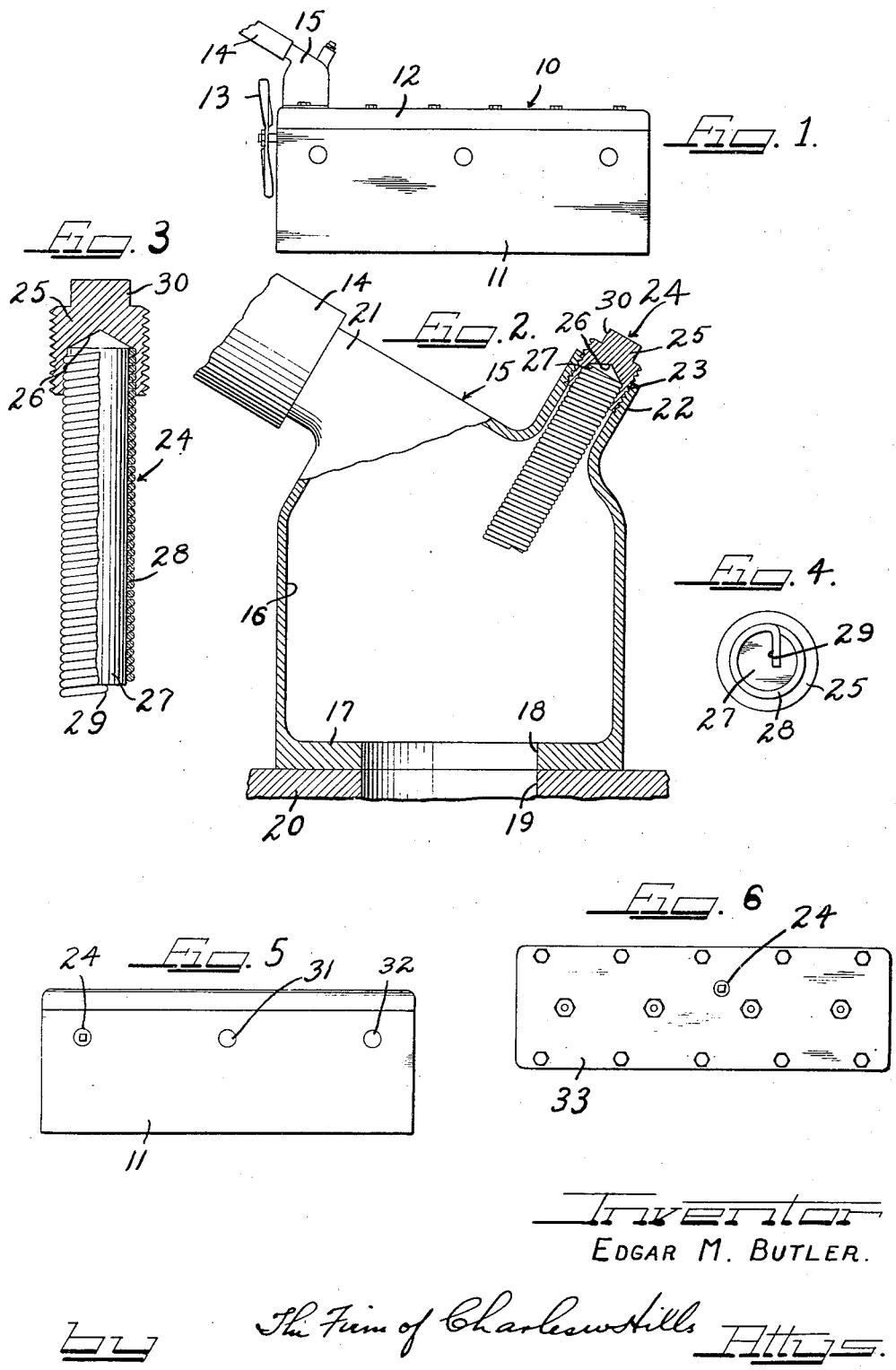

2,451,068

UNITED STATES PATENT OFFICE 2,451,068

ELECTROLYTIC WATER CORRECTION DEVICE FOR INSERTION IN CIRCULATORY SYSTEMS

Edgar M. Butler, New Orleans, La.

Application November 16, 1946, Serial No. 710,312

5 Claims. (Cl. 204—248)

This invention relates to an electrolytic water correction device for insertion in a circulatory system, such as the water cooling system of an internal combustion engine.

It has long been known in the operation of internal combustion engines employing a water cooling system that scale forms on the heat transfer surfaces of the water jacket and cuts down the efficiency of heat transfer from the engine to the water in the circulatory system. It has not been generally appreciated, however, that this loss in heat transfer efficiency has necessitated the use of a larger volume of cooling system than would otherwise be required, and, further that there is also a concomitant loss in engine efficiency due to over-heating of the engine in warm weather. Because of the hardness of much of the water used in the cooling systems of internal combustion engines, particularly those of automotive vehicles, scale not only forms on the heat exchange surfaces between the engine and the water of the cooling system but also upon the internal surface of the pump and of the radiator tube. In those areas of the country where the water used has a particularly high "permanent hardness," the situation is so much aggravated that the cooling system may actually become clogged up with scale deposit from the water used.

I have now found that self-energizing electrolytic water correction devices may be employed in the water cooling systems of internal combustion engines to increase the efficiency of heat transfer between the engine and the water of the cooling system. As pointed out in my copending application for patent Serial No. 672,930, filed May 29, 1946, of which the present is a continuation-in-part application, devices of my invention intended for such use include a positive element, which may be copper or a copper- or silver-plated foundation metal, or other metal low in the electromotive series of metals, and a negative element, which is preferably a metal selected from the group consisting of zinc, aluminum and magnesium. In accordance with well-known electro-chemical principles, a device such as described acts as a galvanic couple when immersed in an aqueous electrolyte, the negative element electrolytically dispersed into the water to produce metallic ions that immediately combine with the water to give hydrated metallic ions. These metallic ions react with hydroxyl ions to yield insoluble metallic hydroxides. Either the metallic ions themselves or the insoluble metallic hydroxides that are formed react with or in some way entrain the calcium and magnesium ions present in the water. The result is that a soft sludge is formed rather than the usual hard, adherent scale of lime that builds up on heat transfer surfaces in the case of untreated "hard" water. In addition to preventing scale formation, the use of my self-energizing electrolytic water correction devices in the cooling systems of internal combustion engines tends to break up any scale already formed. As a result of the removal of calcium and magnesium ions from the water, the water in contact with any scale already formed is almost free of these ions, and hence has the capacity for dissolving the salt that composes the scale. This action may not be entirely due to complete dissolution of the scale but may be due to the fact that the scale deposit usually comprises two or more salts that differ considerably in solubility, so that the dissolution of the more soluble salt weakens the scale structure sufficiently to cause the scale to fall away from the heat transfer surfaces of its own accord.

My self-energizing electrolytic devices have the further effect of minimizing oxygen corrosion, in that oxygen is removed from the water by electrolytic reduction and reaction with the metallic ions produced as a result of the electrolytic action of the galvanic couple. The result is that with less oxygen in the water, less oxides are formed on the surfaces of the cast iron water jacket and these surfaces are therefore more efficient in their transfer of heat from the engine to the water of the cooling system.

It is therefore an important object of this invention to provide an electrolytic water correction device for insertion in a circulatory system, the device being so constructed and arranged that it can be inserted into a wall of the circulatory system for immersion of the negative and positive elements in the water passing therethrough.

It is a further important object of this invention to provide a simple yet effective structure wherein the negative element is sheathed in a relatively tightly coiled helical spring, which serves not only as the positive element but also as a means for threadingly securing the sheathed unit in a plug, by means of which the assembly can be inserted into an opening in a wall of the circulatory system and secured therein.

It is a further important object of this invention to provide a fitting for mounting in the circulatory system of an internal combustion engine, whereby an electrolytic water correction device associated with said fitting may be immersed in the flow through the fitting, and whereby removal of the electrolytic water correction device may be accomplished in a simple manner.

It is a still further important object of this invention to provide a combined fitting and electrolytic water correction device for insertion in the water cooling system of an internal combustion engine, with means provided for the ready insertion and removal of the device without necessitating the disconnection of the fitting from the system.

It is a further important object of this invention to provide a branched fitting for insertion in a water cooling system of an internal combustion engine, one of the branches of the fitting being internally threaded for the reception of an electrolytic water correction device having an externally threaded plug that supports the active parts of the electrolytic device for immersion thereof in the flow of water through the fitting.

Other and further important objects of this invention will be apparent from the disclosures in the specification and the accompanying drawings.

On the drawings:

Figure 1 is a side elevational view of an internal combustion engine cylinder block, illustrating a portion of the cooling system therefor.

Figure 2 is a fragmentary vertical sectional view of the fitting housing an electrolytic water correction device in accordance with my present invention, with parts broken away and in elevation.

Figure 3 is an enlarged longitudinal sectional view, partly in elevation, of the electrolytic water correction device itself.

Figure 4 is a bottom plan view of the device.

Figure 5 is a side elevational view of the engine block showing the positioning of an electrolytic water correction device in place of one of the freeze-out plugs.

Figure 6 is a top plan view of an engine block showing the positioning of an electrolytic water correction device in the cylinder head.

As shown on the drawings:

The reference numeral 10 indicates generally an engine block of an internal combustion engine, such, for instance, as is used in automotive vehicles. Said engine block 10 includes the usual water jacketed cylinder block 11 and the water jacketed cylinder head 12. A conventional fan 13 serves to draw air in through the radiator (not shown) for cooling the water as it circulates through the radiator and also for drawing air in over the engine block itself. Between the usual hose connection, indicated at 14, which extends to the top of the radiator, and the cylinder head 12, is mounted a branched fitting 15 embodying the principles of my present invention.

Said fitting 15, as best illustrated in Figure 2, includes an enlarged body portion 16, the bottom wall 17 of which is provided with an opening 18 for registry with an opening 19 in the top wall 20 of the cylinder head 12. The upper portion of the fitting 15 is provided with an angularly offset reduced neck portion 21 that is cylindrical and of such diameter as to form a tight fit with the end of the hose 14. The upper portion of the fitting 15 is also provided with an angularly disposed cylindrical spout or nipple portion 22 having an internally threaded end 23.

An electrolytic water correction device, indicated generally by the reference numeral 24 is adapted to be inserted into the nipple 22 for retention therein. For this purpose, said device 24 includes an externally threaded end member, or plug, 25 adapted to be threaded into said threaded portion 23. Said plug 25 is also provided with an internally threaded recess 26 for receiving an end of a sheathed negative element 27. The sheath of said element 27 comprises a relatively closely wound helical coil of wire, indicated generally by the reference numeral 28. Said spring coil 28 is normally of a diameter slightly less than the external diameter of the negative element 27, so that when slipped in place over said element 27, the coiled wire will resiliently engage the element and resist relative separation of the two. Furthermore, the free end of the wire coil, such as the end 29 is bent inwardly to overlie the free end of said negative element 27, as best shown in Figure 4. The external diameter of the coiled wire sheath 28 is such that the sheathed negative element can be threaded into the threaded recess 26 of the plug 25 and thus be securely retained therein.

The negative element, or cartridge, 27 is preferably formed of zinc, or other metal, such as aluminum or magnesium, that is relatively high in electromotive force series of metals. Said cartridge 27 may be cylindrical in form, as shown, or may be polygonal in cross section. The coiled spring wire 28 may be formed of hard copper, bronze, or of a ferrous foundation metal having the requisite amount of resiliency, with the surface of the wire either copper or silver plated. Although the coils of the wire sheath 28 are shown as in contact with each other, they may be slightly spaced to permit greater access of the water to the surface of the negative element 27. Even though rather tightly wound, the coils of the wire sheath 28 permit the water by capillary action to penetrate between the coils and into contact with the surface of the negative element 27.

Where the water of the circulatory system contains dissolved substances, as is practically universally the case in water cooling systems of internal combustion engines, the water is capable of acting as an electrolyte to set up a galvanic action between the dissimilar metals of the negative element 27 and of the wire sheath 28, or the coating metal thereof. The numerous coils of the wire sheath 28 in contact with the surface of the negative element 27, or in closely spaced relation thereto, create a myriad of galvanic couples, which serve to bring about the electrolytic action previously described.

By virtue of the construction and arrangement of the unit 24, substantially the entire surface areas of the negative element 27 and of the coiled wire sheath 28 are in contact with the water of the system. At the same time the free end of the unit extends into the active flow of the water through the fitting without substantially obstructing such flow, whereby the metallic ions and hydrated metallic ions formed as a result of the electrolytic action are swept into the flow of water through the fitting and are circulated throughout the system. Also, owing to the positioning of the fitting 15, the water that circulates through the fitting is at substantially its highest temperature and therefore affords optimum conditions for the activity of the electrolytic device. As the heated water from the water jacket of the engine is circulated by the pump over the surfaces of the electrolytic device, such circulation serves to carry the electrolytically formed ions and radicals of the negative element throughout the system to effect reaction with the scale-forming constituents in the water not only in the locality of the device itself but at all points throughout the circulatory system.

The removal of the unit 24 from the fitting 15 can be easily accomplished by putting a wrench on the squared end 30 of the plug 25. The sheathed assembly of the negative cartridge 27 may then be unthreaded from the plug and a new sheathed element inserted. Since the positive element of which the wire coil 28 is formed, or with which it is surfaced, does not itself become consumed, nor is it appreciably corroded or coated during its active life, such sheathed elements can be unthreaded from the plug 25, a new negative element 27 inserted in place and the sheathed new element replaced by a simple threading operation, thereby permitting the reuse of the plug 25. Said plug 25 may be formed of any suitable non-corrodible metal, such as bronze, or the like, or may be formed of a ferrous metal plated with copper, brass or bronze.

It will be noted that the outside diameter of the sheathed unit 24 is less than the inside diameter of the nipple 22, so as to permit the free passage of the unit through the nipple and also the circulation of water up around the secured end of the unit. The turned-in end 29 of the wire sheath prevents the negative cartridge 27 from dropping out. However, the wire sheath 28 grips the negative cartridge so tightly that there is little danger of this Furthermore, during the active life of the unit, the negative cartridge 27 tends to expand, due to the larger volume of the products of corrosion, so that the wire sheath 28, while permitting such expansion, tends to engage the expanded cartridge so tightly as to prevent any unintentional separation of the two.

In Figure 5, there is illustrated an engine block 11 having a row of freeze-out plugs, two of which are indicated at 31 and 32. In place of a third freeze-out plug, a unit 24, such as that already described, is inserted through the opening usually occupied by the third freeze-out plug. Obviously, more than one such unit 24 can be inserted in any of the normal positions occupied by a freeze-out plug. The unit indicated by the reference 24 in Figure 5 is identical in construction, although it may be of a slightly smaller size, with that already described in connection with Figure 1 to 4, inclusive. The free end of the unit, of course, extends into the water of the water jacket about the cylinder block.

In Figure 6, there is illustrated an installation of a unit 24 through the top wall of the cylinder head, indicated generally at 33. Here, again, the unit 24 extends into the water jacket of the cylinder head.

The galvanic couple used in my present invention may take other forms than that specfically shown. For instance, the galvanic couple of the construction shown in Figure 6 of my application Serial No. 672,930, filed May 29, 1946, may be substituted for the wire sheathed cartridge herein illustrated and described.

The term "positive" as used herein designates metals positioned below hydrogen in the electromotive force series of metals. The term "negative" as used herein designates metals positioned above hydrogen in the electromotive force series of metals.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A self-energizing electrolytic water correction device, comprising a plug having an internally threaded recess, a negative metal cartridge and a helical positive metal spring frictionally gripping said cartridge and threaded at one end into said threaded recess for retention therein, the other end of said spring being bent across the corresponding end of said cartridge to prevent accidental separation thereof.

2. A branched fitting for attachment in a water circulatory system having a threaded opening, a plug threaded into said opening and having an internally threaded recess, a negative metal cartridge and a positive element formed of a helically coiled metal spring resiliently gripping said cartridge and threadingly retained at one end in said threaded recess.

3. In an automobile water cooling system, a water enclosing wall portion having opening therethrough, a plug retained in said opening and having an internally threaded inner recess, a cylindrical negative metal cartridge forming an anode, and a closely wound helically coiled positive metal spring forming a cathode and frictionally gripping said cartridge, one end of said spring being threadedly retained in said internally threaded recess and the other end of said spring being bent across the free end of said cartridge to retain said cartridge within said spring.

4. An electrolytic water correction device, comprising a member for insertion through a wall of a water container for mounting therein, said member having an internally threaded cylindrical recess, a cylindrical cartridge of negative metal, and a helically coiled positive metal spring sheathing said cartridge and having an inside diameter normally slightly less than that of said cartridge, a spring sheathed end of said cartridge being threaded into said threaded recess to unite said member and said sheathed cartridge.

5. An electrolytic water correction device, comprising a member for insertion through a wall of a water container for mounting therein, said member having an internally threaded cylindrical recess, a negative metal cartridge, and a helically coiled positive metal spring frictionally gripping said cartridge, a spring sheathed end of said cartridge being threaded into said threaded recess to unite said member and said sheathed cartridge, and the other end of said spring sheathing being offset to overlie the corresponding end of said cartridge to retain the same in place.

EDGAR M. BUTLER.

REFERENCES CITED

The following references are of record in the file of this patent:

UNITED STATES PATENTS

| Number | Name | Date |
| --- | --- | --- |
| 577,134 | Harrison | Feb. 16, 1897 |
| 999,108 | Hickey | July 25, 1911 |